United States Patent
Schaffnit et al.

(10) Patent No.: US 8,642,222 B2
(45) Date of Patent: Feb. 4, 2014

(54) FUEL CELL POWER REQUEST CONTROL STRATEGY

(75) Inventors: Jochen Schaffnit, Darmstadt (DE); Jochen Lenz, Hattersheim (DE); Peter Willimowski, Rossdorf (DE); Andreas Voigt, Neu-Isenberg (DE)

(73) Assignee: GM Global Technology Operations LLC, Detroit, MI (US)

( * ) Notice: Subject to any disclaimer, the term of this patent is extended or adjusted under 35 U.S.C. 154(b) by 1306 days.

(21) Appl. No.: 11/625,257

(22) Filed: Jan. 19, 2007

(65) Prior Publication Data
US 2008/0176111 A1 Jul. 24, 2008

(51) Int. Cl.
*H01M 8/04* (2006.01)

(52) U.S. Cl.
USPC .......... 429/431; 429/430; 429/444; 429/505; 429/513

(58) Field of Classification Search
USPC ........... 429/13, 430, 431, 443, 444, 505, 513
See application file for complete search history.

(56) References Cited

U.S. PATENT DOCUMENTS

| | | | | |
|---|---|---|---|---|
| 6,795,756 | B1 * | 9/2004 | Zhang et al. | 701/22 |
| 2002/0175010 | A1 * | 11/2002 | Kobayashi et al. | 180/65.3 |
| 2004/0065489 | A1 * | 4/2004 | Aberle et al. | 180/65.1 |
| 2004/0083039 | A1 * | 4/2004 | Hunt et al. | 701/22 |
| 2006/0278450 | A1 * | 12/2006 | Shirasaka et al. | 180/65.3 |

* cited by examiner

*Primary Examiner* — Sean P Cullen
(74) *Attorney, Agent, or Firm* — John A. Miller; Miller IP Group, PLC

(57) ABSTRACT

A power request controller that prevents a power request signal to a fuel cell stack controller from providing more compressor air and hydrogen gas than is necessary to meet the current power demands of the vehicle. The stack controller generates a signal of the available current from the fuel cell stack. This signal and the measured current actually being drawn from the stack are received by a proportional-integral (P-I) controller in the power request controller. If the available stack current is significantly greater than the stack current being used, the P-I controller will provide an output signal that reduces the power request signal to the stack controller so that the current produced by the stack and the current being drawn from the stack are substantially the same. A transient detector turns off the P-I controller so that it does not reduce the power request signal during an up-power transient.

6 Claims, 4 Drawing Sheets

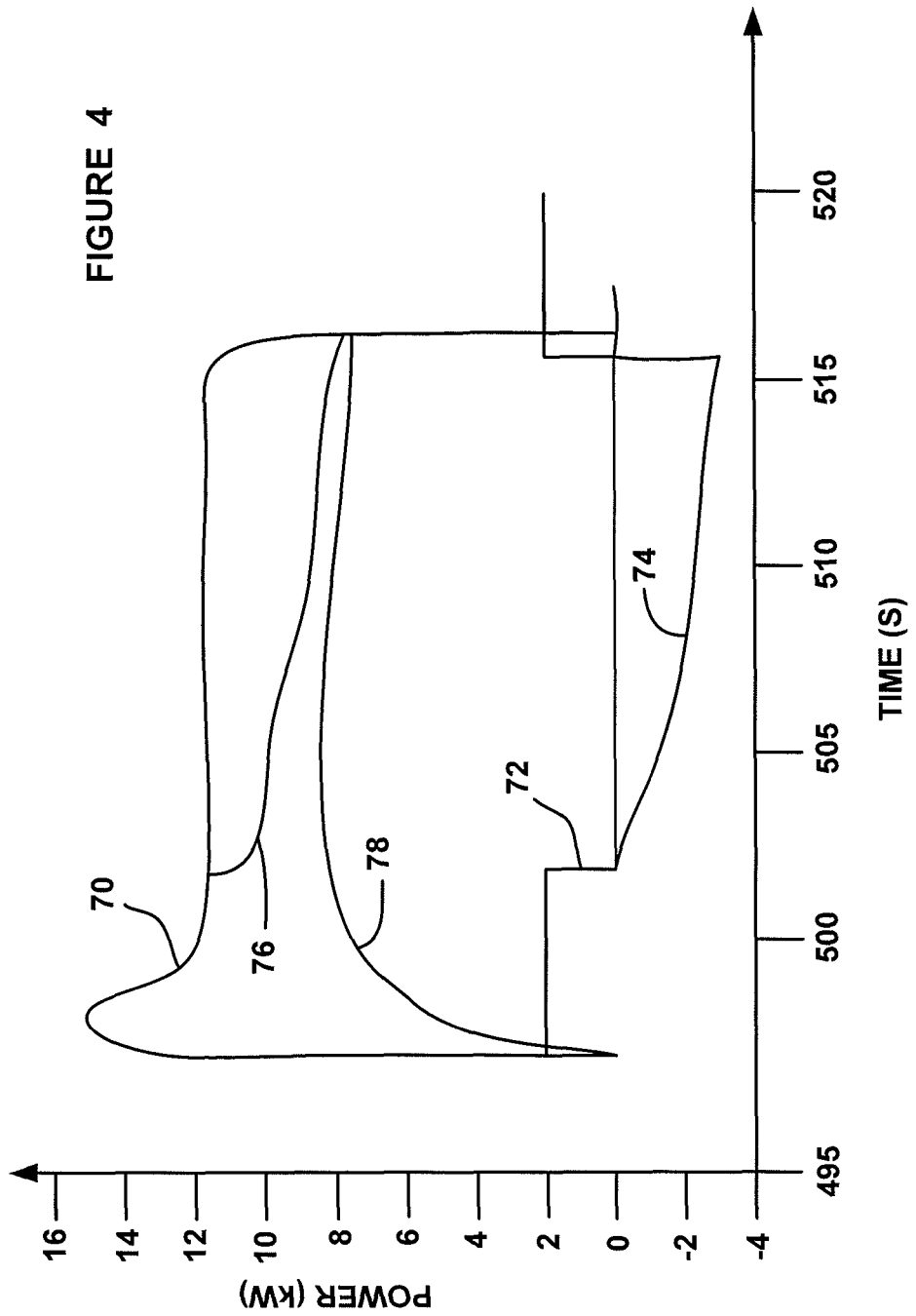

FUEL CELL POWER REQUEST CONTROL STRATEGY

BACKGROUND OF THE INVENTION

1. Field of the Invention

This invention relates generally to a power request control strategy for a fuel cell system and, more particularly, to a fuel cell system for a hybrid fuel cell vehicle that employs a power request control strategy that controls the flow of air and hydrogen to a fuel cell stack so that all of the current that can generated by the fuel cell stack is used by the electrical loads in the system.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The dynamic power of a fuel cell system is limited. Further, the time delay from system start-up to driveability and low acceleration of the vehicle may not be acceptable. During a particular drive cycle, the stack cell voltage varies because the variable driver power request follows the stack polarization curve. The voltage cycles can decrease the stack durability. These drawbacks can be minimized by using a high voltage battery in parallel with the fuel cell stack. Algorithms are employed to provide the distribution of power from the battery and the fuel cell stack to meet the requested power.

For the reasons discussed above, some fuel cell vehicles are hybrid vehicles that employ a rechargeable supplemental power source in addition to the fuel cell stack, such as a DC battery or a super capacitor (also referred to as an ultra-capacitor or double layer capacitor). The power source provides supplemental power for the various vehicle auxiliary loads, for system start-up and during high power demands when the fuel cell stack is unable to provide the desired power. More particularly, the fuel cell stack provides power to a traction motor and other vehicle systems through a DC voltage bus line for vehicle operation. The battery provides the supplemental power to the voltage bus line during those times when additional power is needed beyond what the stack can provide, such as during heavy acceleration. For example, the fuel cell stack may provide 70 kW of power. However, vehicle acceleration may require 100 kW or more of power. The fuel cell stack is used to recharge the battery at those times when the fuel cell stack is able to meet the system power demand. The generator power available from the traction motor during regenerative braking is also used to recharge the battery through the DC bus line.

SUMMARY OF THE INVENTION

In accordance with the teachings of the present invention, a fuel cell power system for a hybrid fuel cell vehicle is disclosed that includes a power request controller that prevents a power request signal to a fuel cell stack controller from providing more compressor air and hydrogen gas than is necessary to meet the current power demands of the vehicle. The stack controller generates a signal of the available current from the fuel cell stack. This signal and the measured current actually being drawn from the fuel cell stack are received by a proportional-integral (P-I) controller in the power request controller. If the available stack current is significantly greater than the stack current being used, the P-I controller will provide an output signal that reduces the power request signal to the stack controller so that the current produced by the stack and the current being drawn from the stack are substantially the same. The power request controller also includes a transient detector that determines whether the power request signal is for a significant up-power transient, and if so, turns off the P-I controller so that it does not reduce the power request signal during the up-power transient.

Additional features of the present invention will become apparent from the following description and appended claims, taken in conjunction with the accompanying drawings.

BRIEF DESCRIPTION OF THE DRAWINGS

FIG. 4 is a graph with time on the horizontal axis and power on the vertical axis showing how the power request controller in FIG. 3 reduces the power request signal so that the available stack current is not more than is needed.

DETAILED DESCRIPTION OF THE EMBODIMENTS

The following discussion of the embodiments of the invention directed to a power request control strategy for a fuel cell system is merely exemplary in nature, and is no way intended to limit the invention or its applications or uses. For example, the power request control strategy of the invention has particular application for a fuel cell hybrid vehicle. However, as will be appreciated by those skilled in the art, the power request control strategy of the invention may have application for other fuel cell systems.

Figure 1:
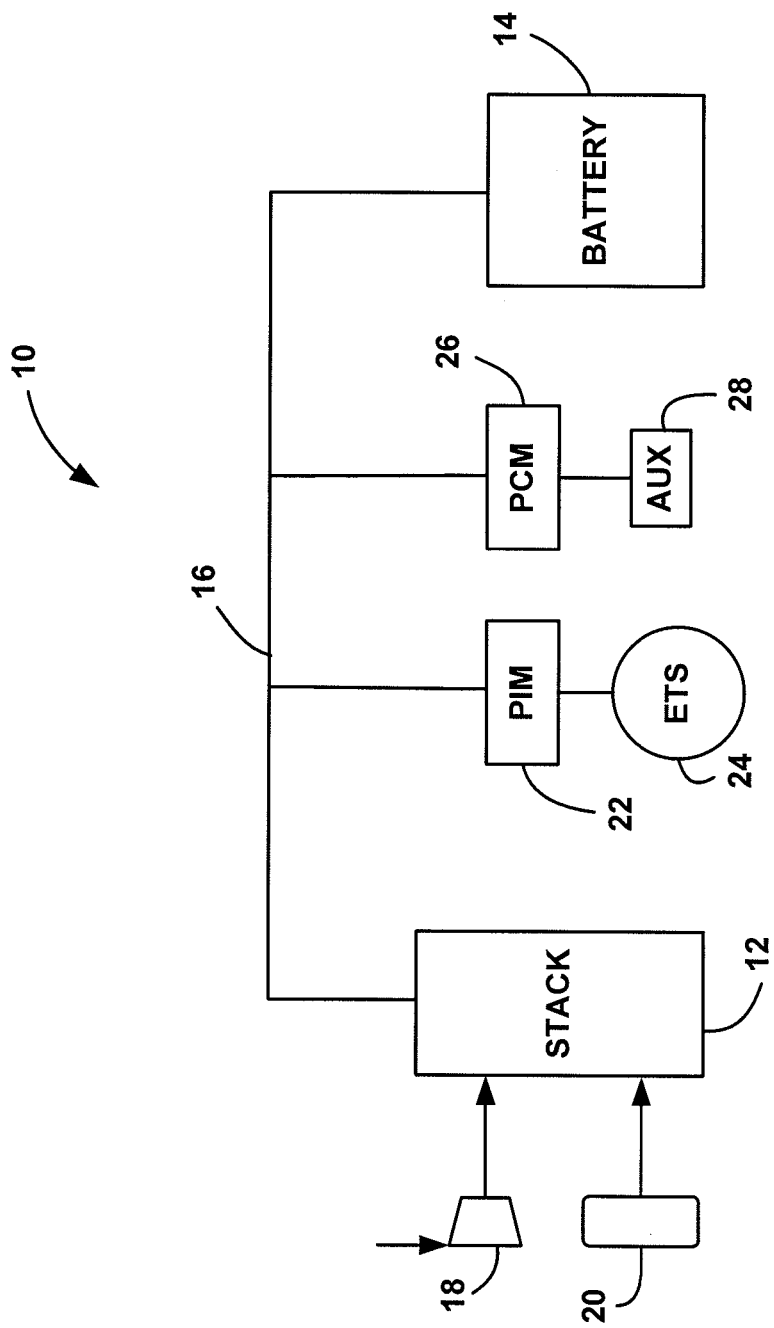
FIG. 1 is a schematic block diagram of a fuel cell system including a fuel cell stack and a high voltage battery.

FIG. 1 is a schematic block diagram of a fuel cell system 10 including a fuel cell stack 12 and a battery 14 that includes power electronics. In order to provide battery charge or discharge, a voltage difference is needed between the stack voltage and the battery voltage. When the stack voltage is greater than the battery voltage, the power electronics operate as a voltage amplifier where the gain is less than or equal to one to charge the battery. The fuel cell stack 12 provides electrical power to a high voltage DC bus line 16. The battery 14 is also coupled to the high voltage bus line 16, and provides supplemental power as discussed above. A compressor 18 provides a flow of air to the cathode side of the fuel cell stack 12 and a hydrogen source 20 provides a flow of hydrogen to the anode side of the fuel cell stack 12.

The fuel cell system 10 includes a power inverter module (PIM) 22 electrically coupled to the bus line 16 and to an ETS 24 having an AC traction motor. The PIM 22 converts the DC voltage on the bus line 16 to an AC voltage suitable for the ETS 24. The ETS 24 provides the traction power to operate the vehicle, as is well understood in the art. The traction motor can be any suitable motor for the purposes described herein, such as an AC induction motor, an AC permanent magnet motor and an AC three-phase synchronous machine. During regenerative braking when the traction motor is operating as a generator, electrical AC power from the motor is converted to DC power by the PIM 22, which is then applied to the bus line 16 to recharge the battery 14. The fuel cell system 10 also includes a 12V bi-directional DC/DC power converter module (PCM) 26 electrically coupled to the bus line 16 that converts the high voltage power on the bus line 16 to a low DC voltage or AC voltage suitable for auxiliary units 28, such as lights, heater, etc., in the vehicle.

The maximum amount of power that can be drawn from the fuel cell stack 12 is dependent upon the hydrogen gas supply to the stack 12. For fuel cell vehicles, the electrical load on the stack 12 is mainly dependent upon the driver's torque request. Thus, the amount of electrical power necessary to satisfy the torque request needs to be calculated. Based on this electrical power, the hydrogen supply for the stack 12 is determined. As soon as the hydrogen gas supply is provided, the corresponding current from the stack 12 is available. If the hydrogen gas supply provided to the fuel cell stack 12 is for a higher load than is actually being drawn from the stack 12, the stack operating conditions and performance may be adversely affected. Therefore, if the current flow from the stack 12 is less than the current available from the stack 12 based on the hydrogen flow rate and airflow, it is desirable to reduce the power request to the fuel cell stack 12 to match the current being drawn.

Figure 2:
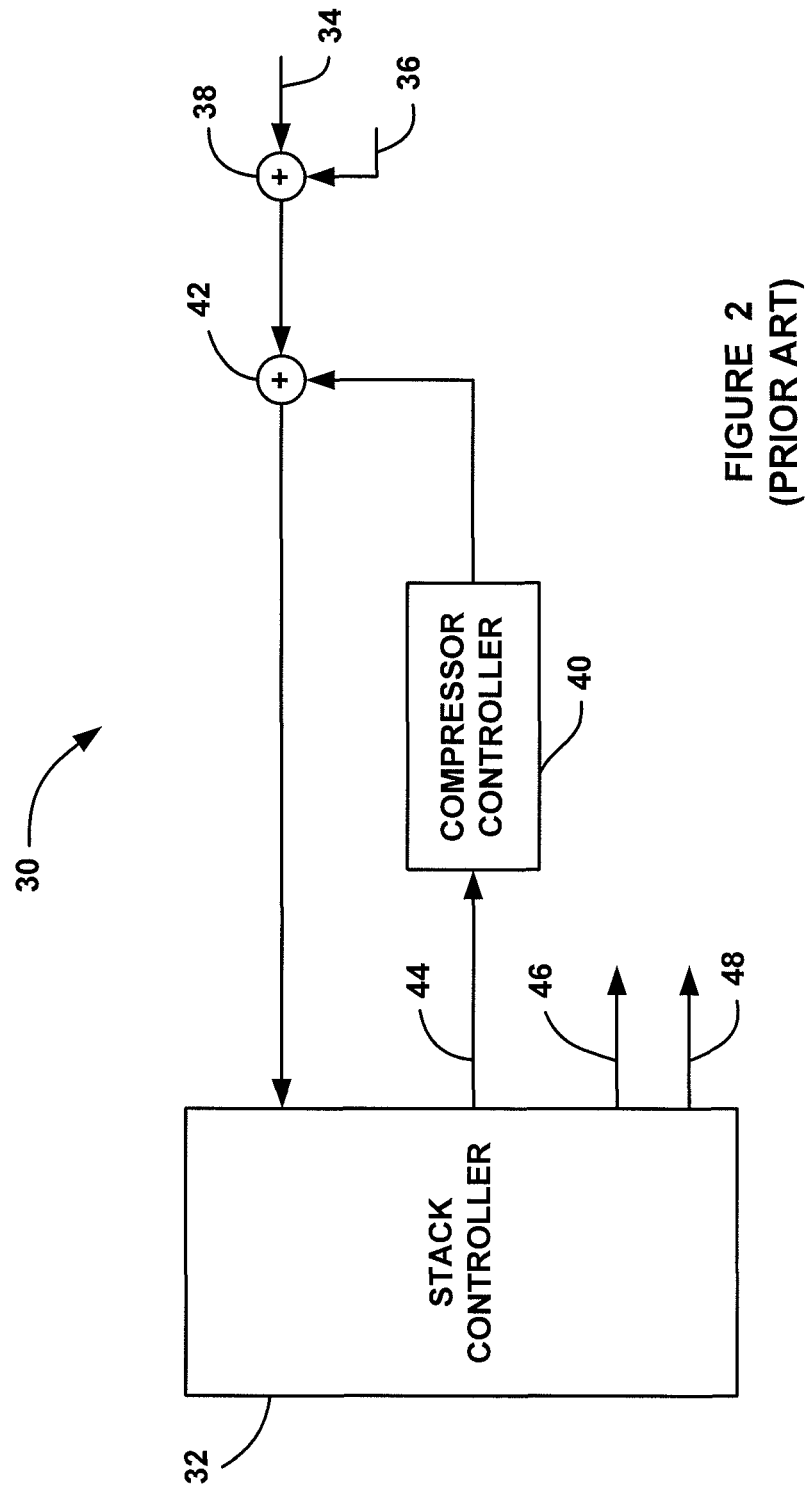
FIG. 2 is a block diagram of a known fuel cell power system for a fuel cell hybrid vehicle.

FIG. 2 is a block diagram of a fuel cell power system 30 including a stack controller 32 for a fuel cell system on a hybrid vehicle. When the vehicle operator provides a torque request for the ETS 24 for a particular vehicle speed, that torque request is converted into a power request signal that is provided on line 34. The power request signal is added to an auxiliary power request signal on line 36 from the various auxiliary sources by an adder 38. The total fuel cell module power request signal from the adder 38 is then added to a compressor power request signal from a compressor controller 40 by an adder 42. A stack power request signal is then sent to the stack controller 32 to provide the desired power from the stack 12 to satisfy the power requests. The stack controller 32 employs an algorithm, several of which are known by those skilled in the art, that generates a desired air mass flow on line 44 and a desired hydrogen flow rate to the stack 12 on line 46 for the power request. The desired air mass flow is converted by the compressor controller 40 to the compressor power request signal and sent to the adder 42. Based on the air mass flow signal and the hydrogen flow rate signal, the stack controller 32 also outputs a signal on line 48 identifying how much current can be drawn from the fuel cell stack 12 by the various loads. The system 30 may also include a power limitation controller (not shown) that prevents more current from being drawn from the stack 12 than is available, which reduces the allowed power for the system loads.

Mathematical models are generally used to convert the torque request from the driver to the ETS power request on the line 34. For example, a mathematical model can be used to estimate the necessary electrical power to achieve a certain mechanical torque in a fuel cell vehicle. Because these models typically may have various inaccuracies for certain operating conditions, the stack controller 32 may cause the flow of air and hydrogen to the stack 12 to be for a higher current that can be provided by the stack 12 that is more than what is being drawn from the stack 12. Particularly, even with accurate models, it cannot be assured that an exact power request is met in all operating conditions of the vehicle during the whole drive cycle as a result of various operating parameters, such as changes caused by the deterioration of components. In this situation, because more air from the compressor 18 is being provided to the fuel cell stack 12 than is necessary for the desired current draw from the stack 12, the stack 12 does not generate enough water to maintain the humidity of the membranes within the stack 12, thus causing them to dry out, possibly decreasing the life of the stack 12.

Figure 3:
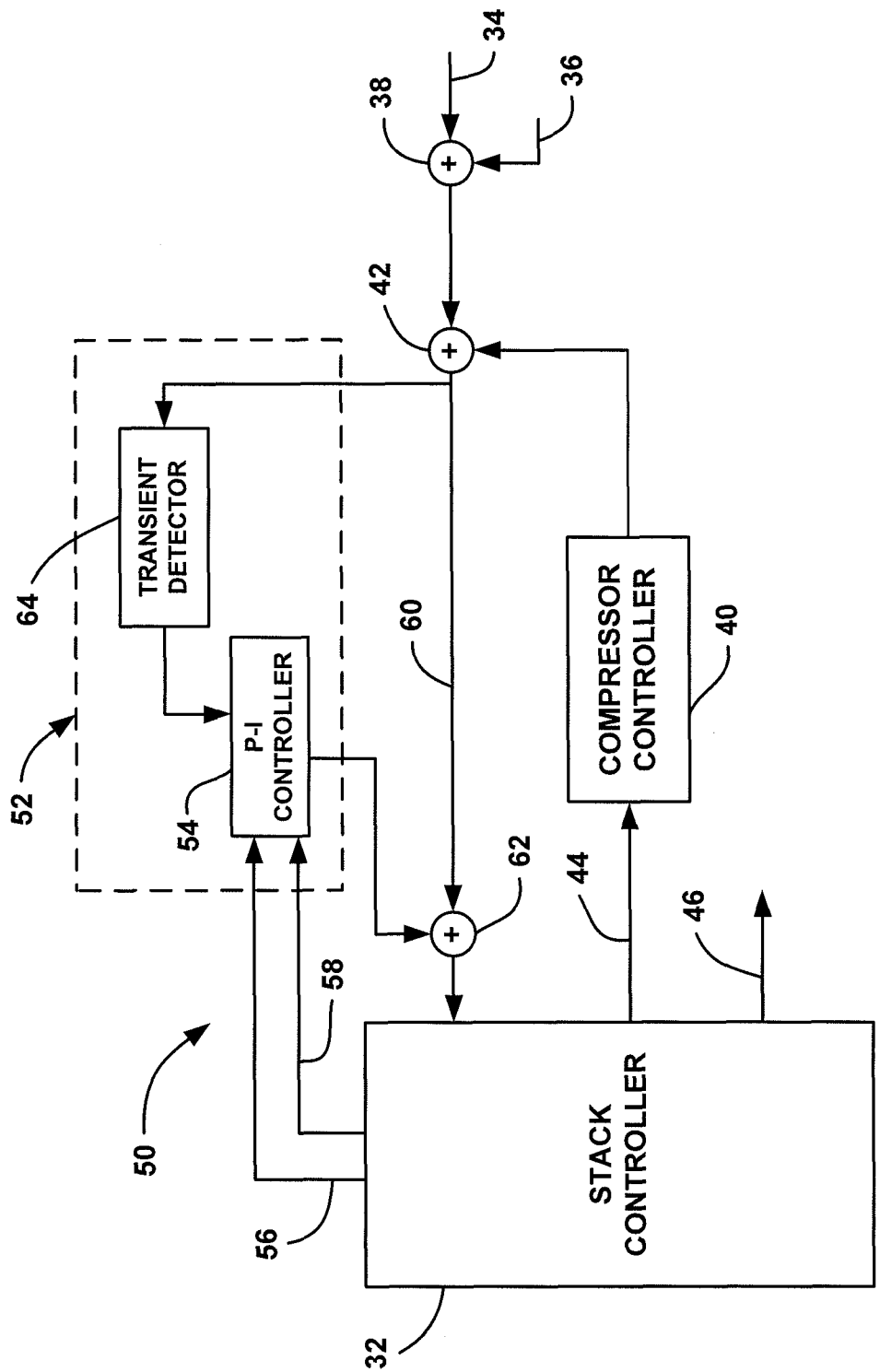
FIG. 3 is a block diagram of a fuel cell power system for a fuel cell hybrid vehicle that includes a power request controller for preventing a power request signal from providing more available stack current than is needed, according to an embodiment of the present invention.

FIG. 3 is a block diagram of a fuel cell power system 50 similar to the fuel cell power system 30, where like elements are identified by the same reference numeral, according to an embodiment of the present invention. The system 50 includes a power request controller sub-system 52 including a P-I power request controller 54. The P-I controller 54 receives a signal on line 56 from the stack controller 32 indicative of the actual stack current that is being drawn from the stack 12, and a signal on line 58 indicative of the available current that the stack 12 could produce given the current system operating conditions, such as temperature, cell voltage, hydrogen supply, air supply, etc. One of ordinary skill in the art would readily recognize various algorithms that can be employed to calculate the actual stack current and the available stack current from the stack 12 in the controller 32.

The P-I controller 54 compares the available stack current signal and the actual stack current signal, and if the available stack current is significantly greater than the actual stack current, then the P-I controller 54 outputs a power request reducing signal that reduces the power request signal to the controller 32 the proper amount so that the two signals are significantly equal. Particularly, the P-I controller 54 outputs a signal to an adder 62 that is added to a raw stack power request signal on line 60 from the adder 42 that reduces the raw stack power request signal to a stack power request signal that is applied to the stack controller 32 to generate the desired compressor speed and hydrogen flow rate on the lines 44 and 46, respectively, so that the available stack current and the actual stack current substantially match. The P-I controller 54 does not output a power request reducing signal to the adder 62 if the desired stack current is greater than the available stack current or if the available stack current is greater than the actual stack current by less than a predetermined threshold, such as 5 amps.

For an up-power transient request, for example, during acceleration, the quality of the requested stack current and the actual stack current cannot be achieved because the limited dynamics of the fuel cell stack 12 creates a response delay between the requested and the available current. During these transient conditions, the power request signal is not reduced. Particularly, there is generally some lag time between when the stack power request signal goes up for a new power request, and when the stack 12 is able to provide the current available from, for example, compressor ramp-up, valve switching, etc. Therefore, according to the invention, the P-I controller 54 is deactivated if an up-power transient is detected. When the controller 54 is active, the requested steady state power is still much higher than the actual power. This difference gets reduced by the controller 54 to achieve the quality of the requested power in the actual stack current.

As discussed above, it is desirable to turn off the P-I controller 54 during an up-power transient so that the P-I controller 54 does not reduce the power request signal during the up-power transient. To satisfy this desire, the power request controller 52 includes a transient detector 64 that receives the raw stack power request signal from the adder 42. If the transient detector 64 determines that the raw stack power request signal from the adder 42 is increasing at such a rate as to indicate an up-power transient, then the transient detector 64 outputs a signal to the P-I controller 54 that prevents the P-I controller from outputting the power inducing signal to the adder 62 to reduce the stack power request signal. In one non-limiting embodiment, the transient detector 64 deactivates the P-I controller 54 if the raw stack power request signal changes more than 10% of the maximum stack power in one second. When the up-power transient is over, and the system is back to a steady-state operation, then the transient detector 64 can switch the P-I controller 54 back on. In one non-limiting example, the time that the P-I controller 54 is deactivated during an up-power transient can be three times the 10-90% step response of the stack 12 to assure that a steady state can be reached before the P-I controller 54 becomes active again.

FIG. 4 is a graph with time on the horizontal axis and power (kW) on the vertical axis showing some of the signals in the system 50 to provide a more thorough understanding of the invention. Graph line 70 represents the raw stack power request signal from the adder 42. The raw stack power request signal has an immediate up-power transient, where the P-I controller 54 is deactivated by the transient detector 64 by signal line 72. When the P-I controller activation signal goes back to zero at time of about 502 seconds, the P-I controller 54 starts outputting the power reducing signal to the adder 62 on graph line 74 to reduce the raw stack power request signal to get the stack power request signal from the adder 62 shown by graph line 76. The proportional part of the controller 54 multiplies the difference between the actual and the desired stack current value to generate the output of the P-I controller 54 on the graph line 74. In response to the output from the P-I controller 54, the raw stack power request signal from the adder 42 is reduced to provide the stack power request signal on the graph line 76. Further, the stack power on graph line 78 reaches the stack power request signal on the graph line 76 at some period of time, which is desired.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system for a hybrid fuel cell vehicle, said system comprising:
a fuel cell stack responsive to a cathode air flow and an anode hydrogen gas flow;
a compressor configured to provide the cathode air flow to the fuel cell stack;
a first adder configured to add an electric traction system power request signal from an electric traction system on the vehicle, an auxiliary power request signal from auxiliary power loads on the vehicle and a compressor power request signal that determines the speed of the compressor to provide a raw stack power request signal;
a fuel cell stack controller configured to generate a hydrogen flow rate signal for providing a desired hydrogen flow rate to the fuel cell stack, a desired air flow signal that is used to generate the compressor power request signal, and available stack current signal indicative of the current that is available from the fuel cell stack and an actual stack current signal indicative of the actual current being drawn from the fuel cell stack;
a power request controller configured to respond to the actual stack current signal and the available stack current signal, and to provide a fuel cell power request reducing signal if the available stack current signal is greater than the actual stack current signal;
a second adder configured to add the fuel cell power request reducing signal and the raw stack power request signal to generate a stack power request signal that is sent to the fuel cell stack controller so that the actual stack current signal and the available stack current signal are about equal; and
a transient detector, said transient detector configured to respond to the raw stack power request signal, said transient detector turning off the power request controller if the transient detector detects an up-power transient.

2. The system according to claim 1 wherein the transient detector turns off the power request controller if the raw stack power request signal changes more than 10% of a maximum stack power in one second or less.

3. The system according to claim 1 wherein the transient detector maintains the power request controller in the off condition for a time period of about three times a 10-90% step response of the fuel cell stack.

4. The system according to claim 1 wherein the power request controller is configured to only provide the fuel cell power request reducing signal if the available stack current signal is greater than the actual stack current signal by a predetermined threshold.

5. The system according to claim 4 wherein the predetermined threshold is about 5 amps.

6. The system according to claim 1 wherein the power request controller is a proportional-integral controller.

* * * * *